(12) United States Patent
Holmes

(10) Patent No.: US 9,969,254 B2
(45) Date of Patent: May 15, 2018

(54) MULTI-STATE POWERTRAIN SYSTEM INCLUDING A SINGLE TORQUE MACHINE

(71) Applicant: GM GLOBAL TECHNOLOGY OPERATIONS LLC, Detroit, MI (US)

(72) Inventor: Alan G. Holmes, Clarkston, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 19 days.

(21) Appl. No.: 15/166,530

(22) Filed: May 27, 2016

(65) Prior Publication Data
US 2017/0341501 A1    Nov. 30, 2017

(51) Int. Cl.
| | | |
|---|---|---|
| B60K 6/40 | (2007.10) | |
| B60K 6/365 | (2007.10) | |
| F16H 3/66 | (2006.01) | |
| F16H 3/72 | (2006.01) | |
| F16H 37/06 | (2006.01) | |
| B60K 6/547 | (2007.10) | |

(52) U.S. Cl.
CPC .......... B60K 6/365 (2013.01); B60K 6/40 (2013.01); B60K 6/547 (2013.01); F16H 3/666 (2013.01); F16H 3/725 (2013.01); F16H 37/065 (2013.01); *B60Y 2200/92* (2013.01); *B60Y 2400/732* (2013.01); *F16H 2200/0034* (2013.01); *F16H 2200/2007* (2013.01); *F16H 2200/2035* (2013.01); *Y10S 903/911* (2013.01); *Y10S 903/919* (2013.01); *Y10S 903/951* (2013.01)

(58) Field of Classification Search
CPC .......... B60K 6/365; B60K 6/40; B60K 6/547; F16H 3/666; F16H 3/725; F16H 37/065; F16H 2200/0034; F16H 2200/2007; F16H 2200/2035; B60Y 2200/92; B60Y 2400/732
USPC ...................................... 180/65.25
See application file for complete search history.

(56) References Cited

U.S. PATENT DOCUMENTS

| | | | | | |
|---|---|---|---|---|---|
| 5,934,395 | A * | 8/1999 | Koide | ............ | B60K 6/40 180/65.235 |
| 6,306,057 | B1 * | 10/2001 | Morisawa | ............ | B60K 6/365 475/5 |
| 6,383,114 | B1 * | 5/2002 | Hoshiya | ............ | B60K 6/365 477/111 |
| 7,097,583 | B2 * | 8/2006 | Lauinger | ............ | F16H 37/0846 475/214 |
| 7,497,285 | B1 * | 3/2009 | Radev | ............ | B60K 6/26 180/65.225 |
| 8,974,337 | B2 * | 3/2015 | Kawasaki | ............ | B60K 6/445 475/5 |
| 9,676,267 | B2 * | 6/2017 | Hirose | ............ | B60K 6/48 |

(Continued)

*Primary Examiner* — James A Shriver, II
*Assistant Examiner* — Brian L Cassidy
(74) *Attorney, Agent, or Firm* — Quinn IP Law

(57) ABSTRACT

A powertrain system is described, and includes an internal combustion engine having a crank member, a torque machine having a rotatable shaft member, and a transmission having an input member and an output member. The crank member of the internal combustion engine is couplable to the input member of the transmission. The rotatable shaft member of the torque machine is couplable to the crank member of the internal combustion engine at a first gear ratio. The rotatable shaft member of the torque machine is couplable to the input member of the transmission at a second gear ratio. The first gear ratio is less than the second gear ratio.

14 Claims, 2 Drawing Sheets

(56) References Cited

U.S. PATENT DOCUMENTS

| | | | |
|---|---|---|---|
| 2007/0095587 A1* | 5/2007 | DuCharme | B60K 6/12 180/65.31 |
| 2007/0184932 A1* | 8/2007 | Tabata | F16H 3/663 475/275 |
| 2008/0099260 A1* | 5/2008 | Abe | B60K 6/365 180/65.235 |
| 2008/0200296 A1* | 8/2008 | Holmes | F16H 3/728 475/5 |
| 2008/0207372 A1* | 8/2008 | Holmes | F16H 3/728 475/5 |
| 2008/0236917 A1* | 10/2008 | Abe | B60K 6/365 180/65.235 |
| 2009/0314559 A1* | 12/2009 | Palitto | B60K 5/08 180/65.22 |
| 2010/0029428 A1* | 2/2010 | Abe | B60K 6/365 475/5 |
| 2010/0056312 A1* | 3/2010 | Akutsu | B60K 6/365 475/1 |
| 2010/0240491 A1* | 9/2010 | Vyas | B60K 6/40 477/3 |
| 2010/0240492 A1* | 9/2010 | Vyas | B60K 6/365 477/3 |
| 2015/0051767 A1* | 2/2015 | Mohri | B60L 11/005 701/22 |
| 2015/0148172 A1* | 5/2015 | Puiu | B60K 6/365 475/5 |
| 2017/0113695 A1* | 4/2017 | Kim | F02D 41/0087 |
| 2017/0240163 A1* | 8/2017 | Suenaga | B60W 20/30 |
| 2017/0259809 A1* | 9/2017 | Sakamoto | B60W 20/20 |

* cited by examiner

MULTI-STATE POWERTRAIN SYSTEM INCLUDING A SINGLE TORQUE MACHINE

TECHNICAL FIELD

The concepts in this disclosure relate to power transmission devices.

BACKGROUND

Power transmission devices are employed to transfer mechanical power between one or a plurality of prime movers and a final drive system. Known prime movers include internal combustion engines and non-combustion torque machines. A final drive system may include a differential or other gearing, belt or chain drive mechanisms or fluidic systems that transfer mechanical power to accomplish work. When the power transmission device is employed on a vehicle, the final drive system may include axles that transfer power to vehicle wheels for tractive effort.

SUMMARY

A powertrain system is described, and includes an internal combustion engine having a crank member, a torque machine having a rotatable shaft member, and a transmission having an input member and an output member. The crank member of the internal combustion engine is couplable to the input member of the transmission. The rotatable shaft member of the torque machine is couplable to the crank member of the internal combustion engine at a first gear ratio. The rotatable shaft member of the torque machine is couplable to the input member of the transmission at a second gear ratio. The first gear ratio is less than the second gear ratio.

The above features and advantages, and other features and advantages, of the present teachings are readily apparent from the following detailed description of some of the best modes and other embodiments for carrying out the present teachings, as defined in the appended claims, when taken in connection with the accompanying drawings.

BRIEF DESCRIPTION OF THE DRAWINGS

One or more embodiments will now be described, by way of example, with reference to the accompanying drawings, in which.

DETAILED DESCRIPTION

The components of the disclosed embodiments, as described and illustrated herein, may be arranged and designed in a variety of different configurations. Thus, the following detailed description is not intended to limit the scope of the disclosure, as claimed, but is merely representative of possible embodiments thereof. In addition, while numerous specific details are set forth in the following description in order to provide a thorough understanding of the embodiments disclosed herein, some embodiments can be practiced without some or all of these details. Moreover, for the purpose of clarity, certain technical material that is known in the related art has not been described in detail in order to avoid unnecessarily obscuring the disclosure.

Figure 1:
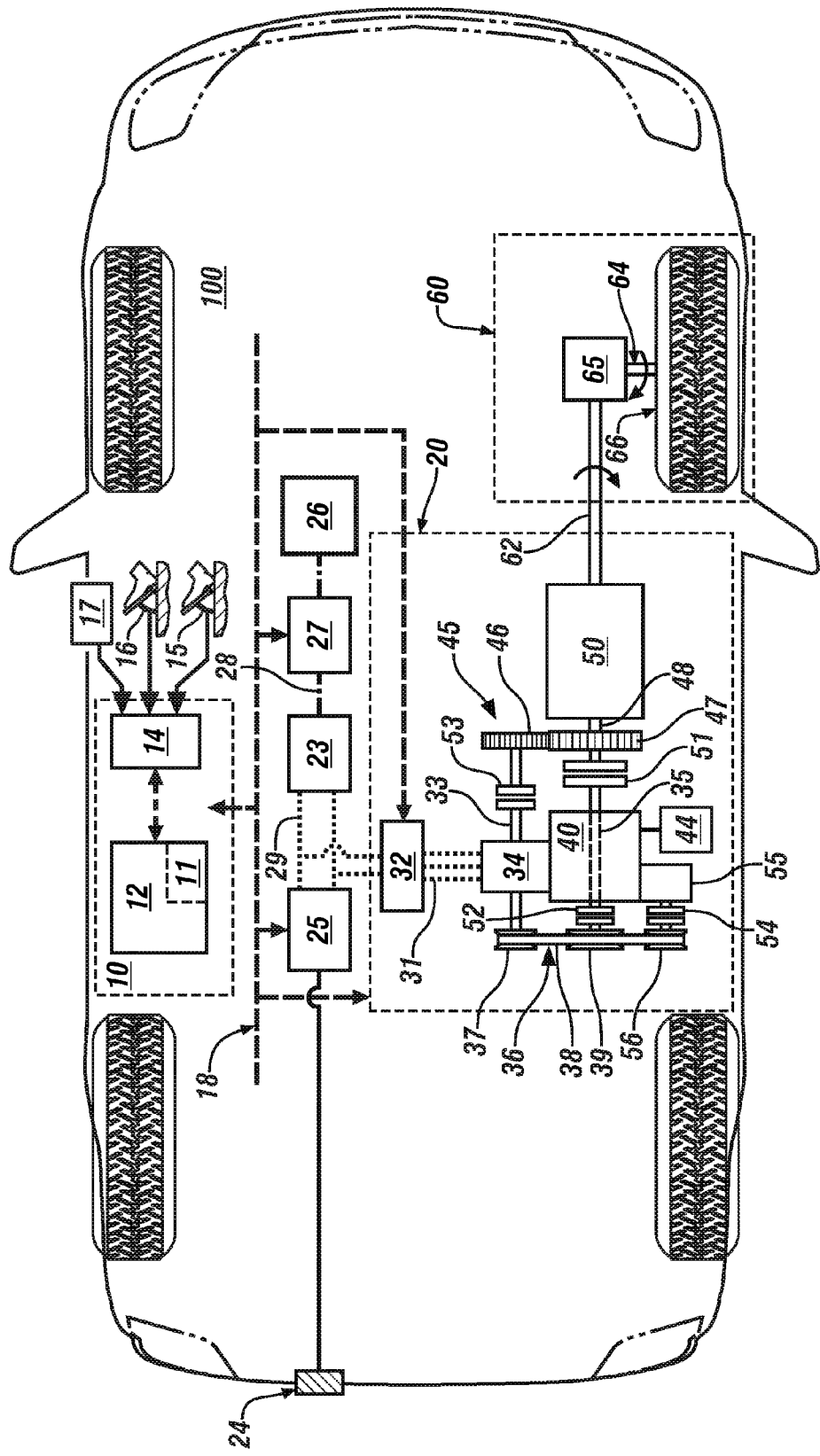
FIG. 1 schematically shows selected elements of a first embodiment of a powertrain system including an internal combustion engine and a single non-combustion torque machine that are arranged to transfer torque through a transmission to a driveline, in accordance with the disclosure.

Referring now to the drawings, wherein the showings are for the purpose of illustrating certain exemplary embodiments only and not for the purpose of limiting the same, FIG. 1 schematically shows selected elements of a powertrain system 20 that is coupled to a driveline 60 and controlled by a control system 10, wherein the powertrain system 20 may be advantageously employed on a vehicle 100 to generate propulsion torque in one of a plurality of operating states. The driveline 60 may include a differential gear device 65 that mechanically couples to an axle 64, transaxle or half-shaft that mechanically couples to one or a plurality of wheel(s) 66 in one embodiment. The driveline 60 transfers tractive power between the transmission 50 and a road surface. Like numerals refer to like elements throughout the description. The powertrain system 20 includes multiple torque-generating devices including an internal combustion engine (engine) 40 and a single non-combustion torque machine, e.g., an electrically-powered motor/generator (electric machine) 34. The engine 40 and electric machine 34 are arranged to transfer mechanical power via a pulley mechanism 36 and/or a gearset 45 through a transmission 50 to the driveline 60. The concepts described herein may apply to any suitable powertrain configuration that includes the engine 40 and the single electric machine 34 that are arranged to generate torque that may be transferred to the driveline 60 via the transmission 50. Embodiments of the vehicle 100 may include, by way of non-limiting examples, a passenger vehicle, a light-duty or heavy-duty truck, a utility vehicle, an agricultural vehicle, an industrial/warehouse vehicle, a recreational off-road vehicle, or another suitable vehicle.

The engine 40 is preferably a multi-cylinder internal combustion engine that converts fuel to mechanical torque through a thermodynamic combustion process. The engine 40 is equipped with a plurality of actuators and sensing devices for monitoring operation and delivering fuel to form in-cylinder combustion charges that generate an expansion force onto pistons that is transferred to the crankshaft 35 to produce torque. The engine 40 is preferably controlled by an engine controller (ECM) 44, including controlling engine operation in one or more various states including, an ON state, an OFF state, an all-cylinder state, a cylinder deactivation state, a fueled state and a fuel cutoff (FCO) state. The engine 40 is preferably mechanized with suitable hardware and the ECM 44 preferably includes suitable executable routines to execute autostart and autostop functions, FCO functions and cylinder deactivation functions during ongoing operation of the powertrain system 20. The engine 40 is considered to be in an OFF state when it is not rotating. The engine 40 is considered to be in an ON state when it is rotating, including one or more FCO states in which the engine 40 is spinning and unfueled. The cylinder deactivation state includes engine operation wherein one or a plurality of the engine cylinders are deactivated by unfueled, unfired, and preferably operating with engine exhaust valves in open states to minimize pumping losses, while remaining cylinders are fueled, firing and producing torque. Engine mechanizations and control routines for executing autostart, autostop, FCO and cylinder deactivation routines are known and not described herein.

The transmission 50 may be a multi-ratio fixed-gear step transmission device that is configured to automatically shift gears at predetermined speed/torque shift points. The transmission 50 is configured to operate in one of a plurality of selectable fixed-gear ratios that achieves a preferred match between an operator torque request and an engine operating point, and preferably employs one or a plurality of differential gear sets and hydraulically-activated clutches to effect gear shifting to permit torque transfer in one of the selectable fixed gear ratios over a range of speed ratios between the input member 48 and output member 62. The transmission 50 may be controlled using a controllable hydraulic circuit that communicates with a transmission controller (TCM). The transmission 50 executes upshifts to shift to a fixed gear that has a lower numerical multiplication ratio (gear ratio) and executes downshifts to shift to a fixed gear that has a higher numerical multiplication ratio. A transmission upshift may require a reduction in engine speed so the engine speed matches transmission output speed multiplied by the gear ratio at a gear ratio associated with a target gear state. A transmission downshift may require an increase in engine speed so the engine speed matches transmission output speed multiplied by the gear ratio at a gear ratio associated with the target gear state. Alternatively, the transmission 50 may be configured as a continuously variable transmission (CVT) using a belt and moveable pulleys or other variable-ratio device and under similar hydraulic control of its continuously-variable ratio. Alternatively, the transmission 50 may be configured as a manually-shifted gearbox. The transmission 50 may include mechanizations for transferring torque in gear states that are associated with either a first, nominally forward direction or a second, nominally reverse direction between the input member 48 and the output member 62 in one embodiment. Alternatively, the transmission 50 includes a simplified gearset that is disposed to transfer power in gear states such that a direction of rotation of the output member 62 is the same as the direction of rotation of the input member 48. However, the simplified gearset of the transmission 50 does not include a reversing mechanism, and thus is not disposed to transfer power in a direction of rotation of the output member 62 that is opposite to the direction of rotation of the input member 48.

A high-voltage DC power source 25 is electrically connected to an inverter module 32 via a high-voltage DC bus 29 to transfer high-voltage DC electric power via high-voltage conductors 31 to the electric machine 34 in response to control signals originating in the control system 10. The electric machine 34 is preferably a multi-phase electric motor/generator configured to convert stored electric energy to mechanical power and convert mechanical power to electric energy that may be stored in the DC power source 25. The electric machine 34 preferably includes a rotor that is coupled to the rotatable member 33 and a stator, and electrically connects via the inverter module 32 and the high-voltage bus 29 to the DC power source 25. The inverter module 32 is configured with suitable control circuits including power transistors, e.g., IGBTs for transforming high-voltage DC electric power to high-voltage AC electric power and transforming high-voltage AC electric power to high-voltage DC electric power. The inverter module 32 preferably employs pulsewidth-modulating (PWM) control of the IGBTs to convert stored DC electric power originating in the DC power source 25 to AC electric power to drive the electric machine 34 to generate torque. Similarly, the inverter module 32 converts mechanical power transferred to the electric machine 34 to DC electric power to generate electric energy that may be stored in the DC power source 25, including as part of a regenerative control strategy. The inverter module 32 receives motor control commands and controls inverter states to provide the motor drive and regenerative braking functionality. In one embodiment, a DC/DC electric power converter 23 electrically connects to the high-voltage bus 29, and provides electric power to a low-voltage battery 27 via a low-voltage bus 28. Such electric power connections are known and not described in detail. By way of a non-limiting example, the low-voltage battery 27 has a nominal voltage level of 12 Vdc. The low-voltage battery 27 electrically connects to an auxiliary power system to provide low-voltage electric power to low-voltage systems 26 on the vehicle, including, e.g., lighting systems, electric windows, HVAC fans, seats and infotainment systems. The DC power source 25 may be any high-voltage energy storage device, e.g., a multi-cell lithium ion device, an ultra-capacitor, or another suitable device without limitation. Monitored parameters related to the DC power source 25 preferably include a voltage level, a state of charge (SOC), temperature, and others. By way of a non-limiting example, the DC power source 25 has a nominal voltage level of 48 Vdc. In one embodiment, the DC power source 25 may electrically connect via an on-vehicle battery charger 24 to a remote, off-vehicle electric power source for charging while the vehicle 100 is stationary.

The control system 10 includes a controller 12 that signally connects to an operator interface 14 and preferably a plurality of human/machine interface devices. The human/machine interface devices include, e.g., an accelerator pedal 15, a brake pedal 16, and a transmission range selector (PRNDL) 17. Other human/machine interface devices preferably include an ignition switch to enable an operator to crank and start the engine 40, a steering wheel, and a headlamp switch. The accelerator pedal 15 provides signal input indicating an accelerator pedal position and the brake pedal 16 provides signal input indicating a brake pedal position. The transmission range selector 17 provides signal input indicating direction of operator-intended motion of the vehicle including a discrete number of operator-selectable positions indicating the preferred rotational direction of the output member 62 in either a forward or a reverse direction.

The terms controller, control module, module, control, control unit, processor and similar terms refer to any one or various combinations of Application Specific Integrated Circuit(s) (ASIC), electronic circuit(s), central processing unit(s), e.g., microprocessor(s) and an associated non-transitory memory component in the form of memory and storage devices (read only, programmable read only, random access, hard drive, etc.). The non-transitory memory component is capable of storing machine readable instructions in the form of one or more software or firmware programs or routines, combinational logic circuit(s), input/output circuit(s) and devices, signal conditioning and buffer circuitry and other components that can be accessed by one or more processors to provide a described functionality. Input/output circuit(s) and devices include analog/digital converters and related devices that monitor inputs from sensors, with such inputs monitored at a preset sampling frequency or in response to a triggering event. Software, firmware, programs, instructions, control routines, code, algorithms and similar terms mean any controller-executable instruction sets including calibrations and look-up tables. Each controller executes control routine(s) to provide desired functions, including monitoring inputs from sensing devices and other networked controllers and executing control and diagnostic instructions to control operation of actuators. Routines may be executed at regular intervals, for example each 100 microseconds during ongoing operation. Alternatively, routines may be executed in response to occurrence of a triggering event. Communication between controllers, and communication between controllers, actuators and/or sensors may be accomplished using a direct wired point-to-point link, a networked communication bus link, a wireless link or any other suitable communication link. Communication includes exchanging data signals in any suitable form, including, for example, electrical signals via a conductive medium, electromagnetic signals via air, optical signals via optical waveguides, and the like. The data signals may include discrete, analog or digitized analog signals representing inputs from sensors, actuator commands, and communication between controllers. The term "signal" refers to any physically discernible indicator that conveys information, and may be any suitable waveform (e.g., electrical, optical, magnetic, mechanical or electromagnetic), such as DC, AC, sinusoidal-wave, triangular-wave, square-wave, vibration, and the like, that is capable of traveling through a medium.

The rotatable member 33 that is coupled to the rotor of the electric machine 32 is preferably rotatably mechanically couplable to the crankshaft 35 of the engine 40 via a second clutch 52 and a pulley mechanism 36. Preferably, the second clutch 52 rotatably couples the pulley mechanism 36 and the crankshaft 35 of the engine 40 when activated. The rotatable member 33 of the electric machine 34 is rotatably couplable to the input member 48 of the transmission 50 via a third clutch 53 and a gearset 45. The pulley mechanism 36 is arranged to couple rotations of the electric machine 34 and the engine 40 at a first input/output gear ratio when the second clutch 52 is activated.

The gearset 45 preferably includes a positive-displacement gearing mechanism including a first toothed gear 46 that is meshingly engaged with a second toothed gear 47, wherein the first toothed gear 46 is connected to a rotating member that is rotatably connected to the rotatable member 33 of the rotor of the electric machine 34 via activation of the third clutch 53. The second toothed gear 47 can be connected to the crankshaft 35 of the engine 40 by activation of a first clutch 51, and is rotatably connected to the input member 48 of the transmission 50. The tooth counts of the first toothed gear 46 and the second toothed gear 47 are selected to effect a second input/output gear ratio. The gearset 45 is arranged to couple rotations of the electric machine 34 and the input member 48 of the transmission 50 at the second input/output gear ratio. The first input/output gear ratio is substantially less than the second input/output gear ratio. By way of a non-limiting example, first input/output gear ratio may be 2.5:1 and the second input/output gear ratio may be 10:1. Alternatively, the first input/output gear ratio may be 4:1 and the second input/output gear ratio may be 8:1. Alternatively, the first input/output gear ratio and the second input/output gear ratio may be any suitable values, with the second input/output gear ratio preferably greater than the first input/output gear ratio. In one embodiment, an accessory drive device 55 is rotatably connected to the pulley mechanism 36 via a fourth clutch 54. In one embodiment, the accessory drive device 55 is an air conditioning compressor.

The pulley mechanism 36 is configured to effect torque transfer between the engine 40 and the electric machine 34, including transferring torque from the electric machine 34 to the engine 40 for engine autostart and autostop operations, tractive torque assistance, torque transfer for regenerative vehicle braking, and torque transfer from the engine 40 to the electric machine 34 for electrical charging. The pulley mechanism 36 is also configured to effect torque transfer between the accessory drive device 55 and either the engine 40 and the electric machine 34. In one embodiment, the pulley mechanism 36 includes a serpentine belt 38 routed between a first pulley 39 that is rotatably couplable to the crankshaft 35 of the engine 40, a second pulley 37 attached to a rotating shaft that is couplable via the second clutch 52 to the rotor of the electric machine 34, and a third pulley 56 that is rotatably couplable to the accessory drive device 55. The effective diameters of the first pulley 39 and the second pulley 37 are selected to effect the first input/output gear ratio. Alternatively, the pulley mechanism 36 may include a positive-displacement gearing mechanism, or another suitable positive mechanical rotational connection between the engine 40 and the electric machine 34. As such, the electrically-powered electric machine 34 can be employed to rotate the engine 40, and vice-versa. Furthermore, either the electric machine 34 or the engine 40 can be employed to rotate the accessory drive device 55. Other configurations of the multi-mode powertrain system 20 that include the electric machine 34 rotatably mechanically coupled to the engine 40 may be employed within the scope of this disclosure.

When the transmission 50 includes a reverse gear, the pulley mechanism 36 and the gearset 45 preferably have either positive ratios or negative ratios, meaning that they transfer rotation between the crankshaft 35 and the rotatable member 33 of the electric machine 34 in the same direction. As such, the pulley mechanism 36 is configured to drive the first and second pulleys 37, 39 on opposite sides of the belt 38 or, alternatively, the gearset 45 includes an idler gear (not shown) between the first toothed gear 46 and the second toothed gear 47.

The first clutch 51, second clutch 52, third clutch 53 and fourth clutch 54 may be any suitable selectively activatable mechanical devices for transferring rotating mechanical power between a drive member and a driven member. This may include, by way of non-limiting examples, a friction clutch, a one-way clutch, a selectable one-way clutch, or another suitable device. In one embodiment, the first clutch 51 is an operator-actuated clutch device when the transmission 50 is configured as a manually shifted gearbox. Operator-actuated clutch devices and manually shifted gearboxes are known to those skilled in the art.

Operating states for the powertrain system 20 described herein may include an electric vehicle (EV) state, a parallel-hybrid (PH) state, an electric power generation state, an engine starting state, and a vehicle launch/engine starting state, each which may be determined by activation and deactivation of the first clutch 51, second clutch 52 and third clutch 53. Clutch activation associated with the various operating states is indicated with reference to Table 1, wherein 'X' indicates a fully-activated and 'S' indicates a partially-activated (i.e., transmitting torque while slipping) one of the first clutch 51, second clutch 52 and third clutch 53 for this embodiment.

TABLE 1

| Powertrain state | First Clutch 51 | Second Clutch 52 | Third Clutch 53 |
|---|---|---|---|
| EV state | | | X |
| EV state, high ratio engine starting | S | | X |
| High ratio PH state | X | | X |

TABLE 1-continued

| Powertrain state | First Clutch 51 | Second Clutch 52 | Third Clutch 53 |
|---|---|---|---|
| EV state, low ratio engine starting | | S | X |
| Low ratio PH state | | X | X |
| Indirect PH state | | X | X |
| Engine-only state | X | | |
| Neutral charging and engine starting state | | X | |
| Neutral - accessory drive state | | | |

In the EV state, the electric machine 34 generates torque that is transferred to the transmission 50 via the gearset 45 with the third clutch 53 activated. The engine 40 may be in the OFF state, or in an FCO state, or idling. The fourth clutch 54 may be selectively activated to operate the accessory drive device 55.

The PH states include a low ratio PH state and a high ratio PH state. In each of the states, the engine 40 is generating torque that is transferred to the transmission 50 via activation of the first clutch 51. In the high ratio PH state, the electric machine 34 is generating torque that is transferred to the transmission 50 via the gearset 45 with the third clutch 53 activated. In the low ratio PH state, the electric machine 34 is generating torque that is transferred to the transmission 50 via the gearset 45 with the second clutch 52 activated. The fourth clutch 54 may be selectively activated to operate the accessory drive device 55.

In the indirect PH state, the second and third clutches 52 and 53 are activated and engine power is transferred to one or more vehicle wheel(s) 66 only through the pulley mechanism 36. This may be employed under a condition when the operator fails to engage an operator-controlled first clutch 51 if the pulley mechanism 36 and gearset 46 transfer rotation in the same direction. Alternatively, if the pulley mechanism 36 and the gearset 46 transfer rotation in opposite directions, the indirect PH state may be used to provide reverse using the engine 40, and the transmission 50 may be of simplified construction that does not include a reversing mechanism. As such, the gearset of the transmission 50 is disposed to transfer power such that a direction of rotation of the output member 62 is the same as the direction of rotation of the input member 48. However, the gearset of the transmission 50 does not include a reversing mechanism, and thus is not disposed to transfer power in a direction of rotation of the output member 62 that is opposite to the direction of rotation of the input member 48.

In the optional EV state with low ratio engine starting, the second clutch 52 is slipping and the third clutch 53 is activated, which requires that the second clutch be designed for slipping and additional torque from the electric machine 34 to start the engine 40 because of the low ratio. This state might have use in bypassing other states when an operator suddenly commands maximum acceleration, which quickly requires high engine speed and PH operation. In the EV state with high ratio engine starting, the first clutch 51 is slipping and the third clutch 53 is activated. In the engine-only state, the engine 40 is coupled to the transmission 50 via activation of the first clutch 51, and is otherwise decoupled from the pulley mechanism 36 by deactivation of the second clutch 52. The electric machine 34 is also decoupled from providing driveline torque by deactivation of the third clutch 53.

In the electric power generation state, the engine 40 is generating torque that is transferred to the transmission 50 via activation of the first clutch 51 and is transferring torque via the pulley mechanism 36 and the second clutch 52 to the electric machine 34 for electric power generation.

Engine starting may be effected by employing the electric machine 34 to generate torque that is transferred via the pulley mechanism 36 and the second clutch 52 to spin the engine 40 as part of a starting routine. The fourth clutch 54 may be selectively deactivated to avoid operating the accessory drive device 55 during the engine starting.

Neutral can be achieved by deactivating the first, second and third clutches 51, 52, 53, during which operation the electric machine 34 is capable of providing torque for accessory drive purposes.

Such an arrangement facilitates electrification of a powertrain system employing a single, relatively small-sized electric machine having a relatively low motor torque capability. The high gear ratio between the electric machine and the transmission input allows a low transmission input speed while operating in the EV state to minimize clutch speed and power loss for engine starting. Furthermore, a low gear ratio between the electric machine and the engine during operation with the engine in the ON state facilitates hybrid propulsion, such as in the PH state.

Figure 2:
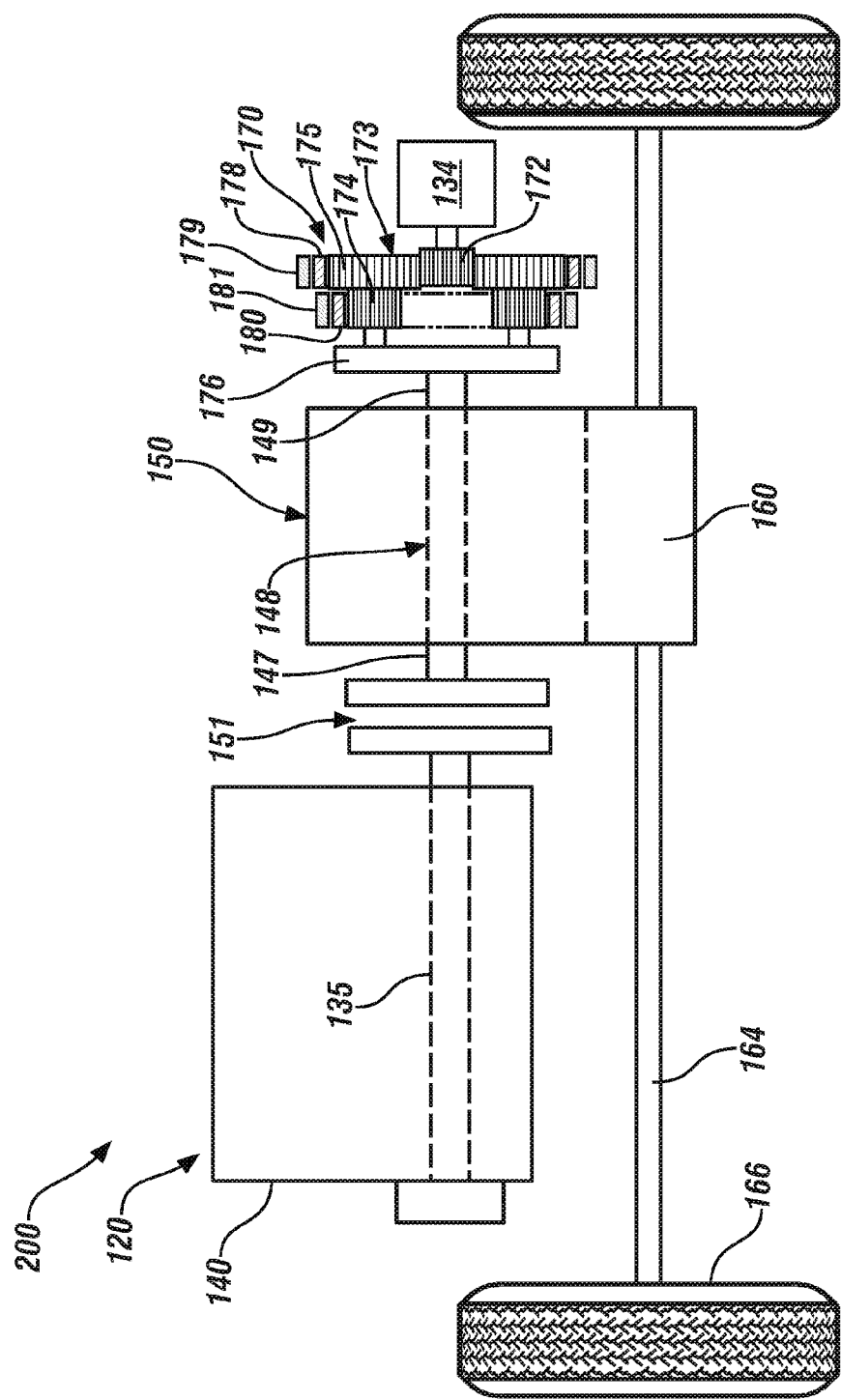
FIG. 2 schematically shows selected elements of another embodiment of a powertrain system including an internal combustion engine and a single non-combustion torque machine that are arranged to transfer torque through a transmission to a driveline, in accordance with the disclosure.

FIG. 2 schematically shows selected elements of another embodiment of a powertrain system 120 that may be coupled to a driveline 160 and controlled by a control system 110, wherein the powertrain system 120 may be advantageously employed on a vehicle 200 to generate propulsion torque. The powertrain system 120 includes multiple torque-generating devices including an engine 140 and a single non-combustion torque machine, e.g., an electrically-powered motor/generator (electric machine) 134. The engine 140 and electric machine 134 are arranged to transfer torque through a transmission 150 that is rotatably to the driveline 160 to transfer torque therebetween. The driveline 160 may include a differential gear device that mechanically couples to one or more axles 164, transaxle or half-shaft that mechanically couples to a wheel 166 in one embodiment. The driveline 160 transfers tractive power between the transmission 150 and a road surface. The concepts described herein may apply to any suitable powertrain configuration that includes the engine 140 and electric machine 134 arranged to generate torque that can be transferred to the driveline 160 via the transmission 150. The concepts described herein are analogous to those described with reference to FIG. 1.

The powertrain system 120 includes the engine 140 and the electric machine 134 arranged as described herein to transfer mechanical power to the transmission 140. The engine 140 includes a crankshaft 135 that may be rotatably couplable to a first end 147 of an input member 148 of the transmission 150 via a first clutch 151. The electric machine 134 includes an output member 133 that is rotatably coupled to its rotor, and the output member 133 is rotatably coupled to a sun gear 172 of a compound planetary gear set 170. A second end 149 of the input member 148 of the transmission 150 passes through the body of the transmission 150 and is rotatably coupled to a carrier 176 of the compound planetary gear set 170.

The compound planetary gear set 170 includes the sun gear 172, a plurality of compound pinion gears 173 that are rotatably coupled to the carrier 176, and first and second ring gears 178, 180, respectively. Each of the compound pinion gears 173 includes a first pinion gear 174 that is rotatably coupled with a second pinion gear 175. The first pinion gear 174 meshingly engages the first ring gear 178 and the second pinion gear 175 meshingly engages the second ring gear 180. Preferably the diameter and tooth count of the first pinion gear 174 is greater than the diameter and tooth count of the second pinion gear 175. A first controllable clutch brake (brake) 179 is couplable to the first ring gear 178 to ground its rotation when activated, and a second controllable clutch brake (brake) 181 is couplable to the second ring gear 180 to ground its rotation when activated. When the first brake 179 is activated, the compound planetary gear set 170 transfers mechanical power at a relatively lower gear ratio, e.g., a 4:1 gear ratio between the electric machine 134 and the input member 148. When the second brake 181 is activated, the compound planetary gear set 170 transfers mechanical power at a relatively higher gear ratio, e.g., an 8:1 gear ratio between the electric machine 134 and the input member 148. The lower and higher gear ratios may be any suitable gear ratios, and are related to the diameter and tooth count of the first pinion gear 174 in relation to the diameter and tooth count of the second pinion gear 175. The first clutch 151 and the first and second brakes 179, 181 may be any suitable selectively activatable mechanical devices, and may include, by way of non-limiting examples, a friction clutch, a one-way clutch, a selectable one-way clutch, or another suitable device. In one embodiment, the first clutch 151 is configured as an operator-actuated clutch device when the transmission 150 is configured as a manually shifted gearbox. Operator-actuated clutch devices and manually shifted gearboxes are known to those skilled in the art.

Operating states for the powertrain system 120 described herein may include an electric vehicle (EV) state, a parallel hybrid (PH) state, an electric power generation state, an engine starting state, and a vehicle launch/engine starting state, each which may be determined by activation and deactivation of the first clutch 151 and the first and second brakes 179, 181. Clutch activation associated with the various operating states is indicated with reference to Table 2, wherein 'X' indicates a fully-activated and 'S' indicates a partially-activated (i.e., transmitting torque while slipping) one of the first clutch 151 and the first and second brakes 179, 181 for this embodiment.

TABLE 2

| Powertrain state | First Clutch 151 | First Brake 179 | Second Brake 181 |
|---|---|---|---|
| High-ratio EV | | | X |
| High-ratio EV state with engine starting | S | | X |
| High-ratio PH state | X | | X |
| Low-ratio EV | | X | |
| Low-ratio EV state with engine starting | S | X | |
| Low-ratio PH state | X | X | |

In the EV states, the electric machine 134 is able to generate torque that may be transferred to the transmission 150 via the compound planetary gear set 170 with one of the first brake 179 and the second brake 181 activated. The engine 140 may be in the OFF state, or an FCO state, or idling. The PH states include a low ratio PH state and a high ratio PH state. In each of the states, the engine 140 is able to generate torque that is transferred to the transmission 150 via compound planetary gear set 170 via activation of the first clutch 151. In the high-ratio PH state, the second brake 181 activated, and the electric machine 134 is able to generate torque that is transferred to the transmission 150. In the low-ratio PH state, the first brake 179 is activated and the electric machine 134 is able to generate torque that is transferred to the transmission 150. The generated torque may also be transferred via the compound planetary gear set 170 with the first brake 181 activated to the electric machine 134 for electric power generation. In the high ratio EV state with engine starting, the electric machine 134 is able to generate torque that may be transferred via the input member 148, the first clutch 151 and the second brake 181 to spin the engine 140 as part of a starting routine. In the low ratio EV state with engine starting, the electric machine 134 is able to generate torque that may be transferred via the input member 148, the first clutch 151 and the first brake 179 to spin the engine 140 as part of a starting routine.

Such an arrangement facilitates electrification of a powertrain system employing a single, relatively small-sized electric machine having a relatively low motor torque capability. The high gear ratio between the electric machine and the transmission input allows a low transmission input speed while operating in the EV state to minimize clutch speed and power loss for engine starting. Furthermore, a low gear ratio between the electric machine and the engine during operation with the engine in the ON state facilitates hybrid propulsion, such as in the PH state.

The embodiments shown with reference to FIGS. 1 and 2 facilitate vehicle operation wherein the engine remains at low or moderate speeds throughout. Such vehicle operation includes launching the vehicle from rest in the EV state, transitioning from the EV state to engine-on operation using the High ratio EV with engine starting state, steady-state cruising in the PH state-high ratio state, and regenerative braking in the EV state.

The detailed description and the drawings or figures are supportive and descriptive of the present teachings, but the scope of the present teachings is defined solely by the claims. While some of the best modes and other embodiments for carrying out the present teachings have been described in detail, various alternative designs and embodiments exist for practicing the present teachings defined in the appended claims.

The invention claimed is:

1. A powertrain system, comprising:
    an internal combustion engine having a crank member;
    a torque machine having a rotatable shaft member;
    a transmission having an input member and an output member;
    a first clutch disposed to couple the crank member of the internal combustion engine to the input member of the transmission;
    a pulley mechanism disposed to couple the rotatable shaft member of the torque machine to the crank member of the internal combustion engine via a second clutch; and
    a gearset disposed to couple the rotatable shaft member of the torque machine to the input member of the transmission via a third clutch;
    wherein the crank member of the internal combustion engine is couplable to the input member of the transmission;
    wherein the rotatable shaft member of the torque machine is couplable to the crank member of the internal combustion engine at a first gear ratio;
    wherein the rotatable shaft member of the torque machine is couplable to the input member of the transmission at a second gear ratio; and
    wherein the first gear ratio is less than the second gear ratio.
2. The powertrain system of claim 1, wherein the pulley mechanism includes a first pulley rotatably coupled to the crank member of the internal combustion engine and a second pulley rotatably couplable via the second clutch to the rotatable shaft member of the torque machine, wherein effective diameters of the first pulley and the second pulley are selected to effect the first gear ratio.

3. The powertrain system of claim 1, wherein the powertrain system is operative to transfer power originating from the internal combustion engine to the transmission via the pulley mechanism by activation of the second clutch and the third clutch.

4. The powertrain system of claim 1, wherein the pulley mechanism is disposed to transfer mechanical power to the input member of the transmission in a first rotational direction, and wherein the gearset is disposed to transfer mechanical power to the input member of the transmission in a second rotational direction opposite to the first rotational direction.

5. The powertrain system of claim 4, wherein the transmission is disposed to operate in a reverse direction comprising the second rotational direction via activation of the second clutch and the third clutch.

6. The powertrain system of claim 4, wherein the transmission is disposed to transfer power such that a direction of rotation of the output member is the same as the direction of rotation of the input member of the transmission, and wherein the transmission is not disposed to transfer power in a direction of rotation of the output member that is opposite to the direction of rotation of the input member of the transmission.

7. The powertrain system of claim 1, wherein the gearset includes a first toothed gear rotatably couplable via the third clutch to the rotatable shaft member of the torque machine and a second toothed gear rotatably connected to the input member of the transmission, and wherein tooth counts of the first toothed gear and the second toothed gear are selected to effect the second gear ratio.

8. The powertrain system of claim 1, wherein the powertrain system is operative in an electric vehicle state when only the third clutch is activated and the first and second clutches are deactivated.

9. The powertrain system of claim 1, wherein the powertrain system is operative in a parallel hybrid state when the second and third clutches are activated.

10. The powertrain system of claim 1, wherein the powertrain system is operative in an electrical power generating state when the first and second clutches are activated.

11. The powertrain system of claim 1, wherein the transmission is configured as a manually shifted gearbox and the first clutch is configured as an operator-actuated clutch device.

12. The powertrain system of claim 1, wherein the powertrain system is operative to effect engine starting, including the electric machine operative to generate torque that is transferred via the pulley mechanism to spin the engine when the second clutch is activated.

13. The powertrain system of claim 1, wherein the first gear ratio is 4:1 and the second gear ratio is 8:1.

14. The powertrain system of claim 1, wherein the first gear ratio is 2.5:1 and the second gear ratio is 20:1.

* * * * *